(12) United States Patent
Ehrlich et al.

(10) Patent No.: US 11,580,555 B2
(45) Date of Patent: Feb. 14, 2023

(54) SYSTEMS AND METHODS FOR RULES-BASED DECISIONING OF EVENTS

(71) Applicant: JPMORGAN CHASE BANK, N.A., New York, NY (US)

(72) Inventors: Joshua Ehrlich, San Francisco, CA (US); Qiuxuan Lin, Santa Clara, CA (US); Siarhei Kuzmin, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/081,279

(22) Filed: Oct. 27, 2020

(65) Prior Publication Data

US 2022/0129896 A1    Apr. 28, 2022

(51) Int. Cl.
*G06Q 20/40* (2012.01)
*G06Q 40/02* (2012.01)
(Continued)

(52) U.S. Cl.
CPC ....... *G06Q 20/405* (2013.01); *G06F 12/0875* (2013.01); *G06N 20/00* (2019.01);
(Continued)

(58) Field of Classification Search
None
See application file for complete search history.

(56) References Cited

U.S. PATENT DOCUMENTS

| 8,719,166 B2 * | 5/2014 | Ganti | G06Q 20/40 705/26.25 |
| 2014/0129357 A1 * | 5/2014 | Goodwin | G06Q 30/02 705/16 |

(Continued)

FOREIGN PATENT DOCUMENTS

| CN | 111681008 A * | 9/2020 |

OTHER PUBLICATIONS

Paul Rubens, What is Cache Memory? How It Improves Computer Performance, entire document pertinent dated Jan. 11, 2020, retrieved from https://www.enterprisestorageforum.com/hardware/cache-memory/ (Year: 2020).*

*Primary Examiner* — Gregory S Cunningham, II
(74) *Attorney, Agent, or Firm* — Greenberg Traurig LLP

(57) ABSTRACT

Systems and methods for rules-based decisioning of events are disclosed. In one embodiment, a method may include: creating an in-memory cache by parsing stored checkpoints, signals, and rules definitions; receiving a checkpoint request; prioritizing the checkpoint request; preparing a basic context, comprising a limited set of objects, for the checkpoint request; using the in-memory cached definitions, generating at least one of a raw signal, an engineered signal, and a secondary signal for the checkpoint request based on the basic context; using the in-memory cached definitions, executing rules on at least one of the basic context, the raw signal, the engineered signal, and the secondary signal to generate a list of potential decisions; reducing the list of potential decisions to a list of final decisions; publishing the (Continued)

final decisions and supporting data rules and signals execution details; and executing the final decisions.

20 Claims, 2 Drawing Sheets

(51) Int. Cl.
*G06F 12/0875* (2016.01)
*G06N 20/00* (2019.01)
(52) U.S. Cl.
CPC ......... *G06Q 20/4016* (2013.01); *G06Q 40/02* (2013.01); *G06F 2212/45* (2013.01)

(56) References Cited

U.S. PATENT DOCUMENTS

| | | | | |
|---|---|---|---|---|
| 2014/0373095 A1* | 12/2014 | Yoon | ........................ | H04L 63/10 709/221 |
| 2018/0114274 A1* | 4/2018 | Wang | ........................ | G06F 40/56 |
| 2020/0065894 A1* | 2/2020 | Hart | ........................ | G06F 16/23 |

* cited by examiner

SYSTEMS AND METHODS FOR RULES-BASED DECISIONING OF EVENTS

FIELD OF THE INVENTION

The present disclosure generally relates to systems and methods for rules-based decisioning of events.

DESCRIPTION OF THE RELATED ART

Often, approaches to rule-based decisioning involve the creation of a library of signals. The signals may be either raw data points or engineered, and are typically managed outside the rules engine. Creation of new signals is complex, and often requires code changes and redeployment. Rules may be composed using simple Boolean logic and comparisons with the values of the signals for the event. Rules can result in only a limited set of decisions, and error handling is separated from the decisioning logic.

SUMMARY OF THE INVENTION

Systems and methods for rules-based decisioning of events are disclosed. In one embodiment, in a financial institution backend comprising at least one computer processor, a method for rules-based decisioning of events may include: (1) creating an in-memory cache by parsing stored checkpoints, signals, and rules definitions; (2) receiving a checkpoint request; (3) prioritizing the checkpoint request; (4) preparing a basic context, comprising a limited set of objects, for the checkpoint request; (5) using the in-memory cached definitions, generating at least one of a raw signal, an engineered signal, and a secondary signal for the checkpoint request based on the basic context; (6) using the in-memory cached definitions, executing rules on at least one of the basic context, the raw signal, the engineered signal, and the secondary signal to generate a list of potential decisions; (7) reducing the list of potential decisions to a list of final decisions; (8) publishing the final decisions and supporting data rules and signals execution details; and (9) executing the final decisions.

In one embodiment, the checkpoint request may be a synchronous request.

In one embodiment, the checkpoint request may be prioritized using a risk queue manager service.

In one embodiment, the basic context may include a limited set of objects that are used as starting ids to request data from other services and generate signals.

In one embodiment, the other service may include at least one of a payment service, a signal service, and a model service.

In one embodiment, the method may further include checking for signals indicating a previous execution of the checkpoint request; and loading signals generated in the previous execution of the checkpoint request.

In one embodiment, the engineered signals may be generated based on at least one user-defined function.

In one embodiment, the method may further include generating at least one machine learning model score.

In one embodiment, the final list of potential decisions may be generated based on the completion of high-priority rules, based on the completion of time-based rules, etc.

In one embodiment, the final rule may include an echo decision.

In one embodiment, the final list of decisions may be reduced based on a hierarchy.

In one embodiment, the hierarchy may be based on restrictiveness.

In one embodiment, the hierarchy may be based on a shortest delay in execution time.

In one embodiment, the hierarchy may be based on machine learning.

According to another embodiment, a system for rules-based decisioning of events may include a financial institution backend comprising at least computer processor and a non-transient computer readable medium. The non-transient computer readable medium may include program instructions that cause the at least one computer processor to perform the following: create an in-memory cache by parsing stored checkpoints, signals, and rules definitions; receive a checkpoint request; prioritize the checkpoint request; prepare a basic context, comprising a limited set of objects, for the checkpoint request; using the in-memory cached definitions, generate at least one of a raw signal, an engineered signal, and a secondary signal for the checkpoint request based on the basic context; using the in-memory cached definitions, execute rules on at least one of the basic context, the raw signal, the engineered signal, and the secondary signal to generate a list of potential decisions; reduce the list of potential decisions to a list of final decisions; publish the final decisions and supporting data rules and signals execution details; and execute the final decisions.

In one embodiment, the other service may include at least one of a payment service, a signal service, and a model service.

In one embodiment, the non-transient computer readable medium may also include program instructions that cause the at least one computer processor to perform the following: check for signals indicating a previous execution of the checkpoint request; and load signals generated in the previous execution of the checkpoint request.

In one embodiment, the non-transient computer readable medium may also include program instructions that cause the at least one computer processor to generate at least one machine learning model score.

In one embodiment, the final list of decisions may be reduced based on a hierarchy, and the hierarchy is based on restrictiveness or a shortest delay in execution time.

In one embodiment, the final list of decisions may be reduced based on a hierarchy, and the hierarchy is based on machine learning.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
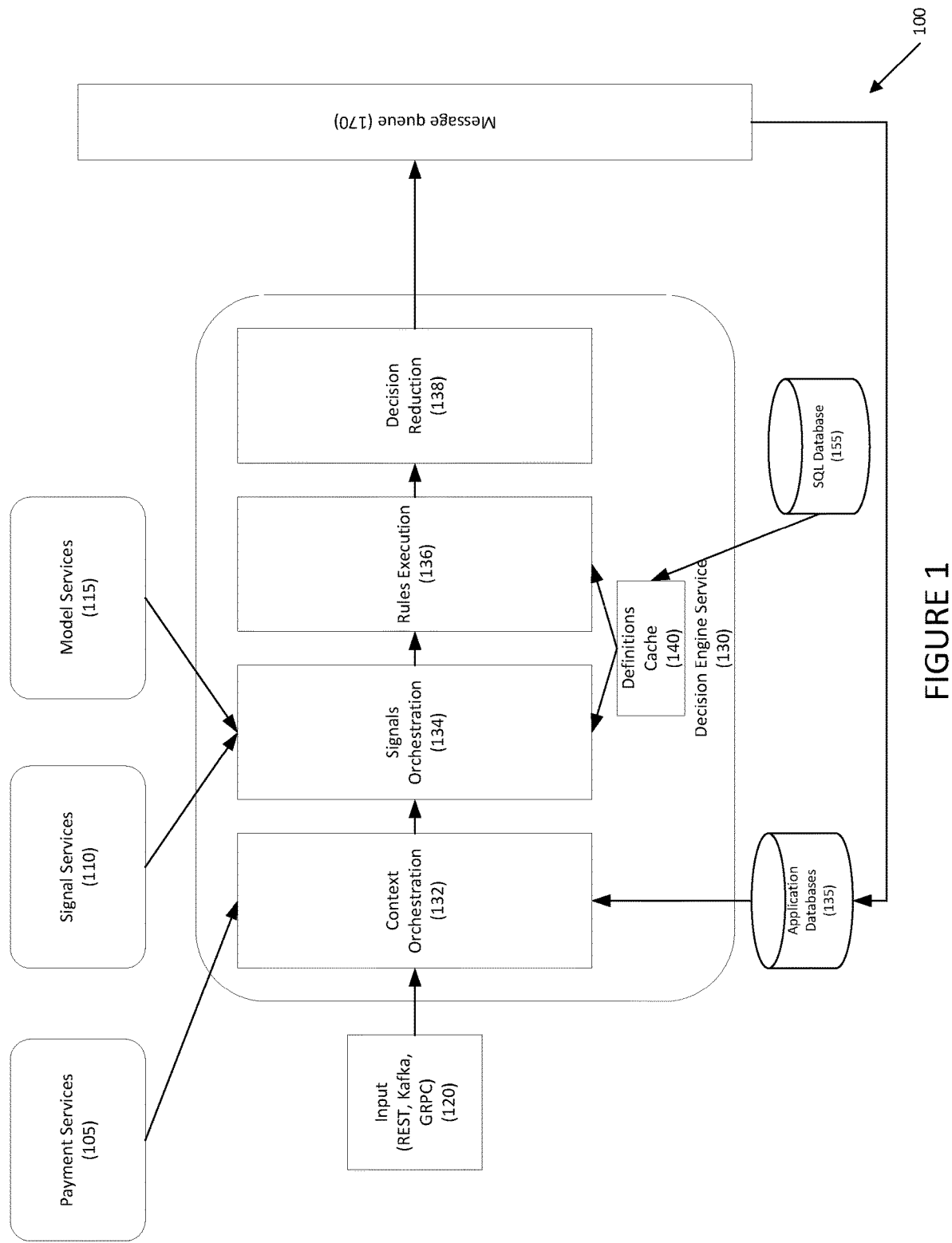
FIG. 1 depicts a system for rules-based decisioning of events according to one embodiment.

Embodiments are generally directed to systems and methods for rules-based decisioning of events. Examples of events include payment events and non-payment events, such as merchant onboarding events, API access events, etc.

Embodiments may leverage a domain specific query language (DSL) that may take into account basic context and raw and engineered signals as "checkpoint event context" (e.g., all in-memory accessible data for the event) for rule-based decisioning. Creation of new signals may be applied into the decisioning system in real-time, without service deployment; this may include machine learning model evaluations as signals. Rules may be simple comparisons of signal values, complex conditional statements based on checkpoint event context, etc. A library of decisions, which may be extensible, may be created. Decisions and error handling of the system may be based on the checkpoint event context.

In embodiment, a risk decision engine may implement a service that provides rule based decisioning for events, such as payment events. An event results in the creation of a checkpoint request that is passed to the risk decision engine for evaluation. The risk decision engine may include four components. The first is a context builder that supplements the initial event with additional data from different risk system. This initial context is then fed to a signal engine that may use a domain specific language (DSL) to extract features that are provided to one or more machine learning models. The results of the models and signals may be provided to the rules engine, which may us the DSL to evaluate the rules. The results of these rules may be written in the DSL and are dynamic decisions and not simply approve or deny. The results may set account facts, publish messages, trigger a group to be reviewed by the risk analysts, block future events, retry the entire execution, etc.

The engine may be checkpoint agnostic, where the checkpoint context-available data point at the checkpoint is driven by the DSL and the DSL definitions at that checkpoint. Checkpoints may be used for events where risk based decisioning is appropriate, such as payment events, merchant onboarding, API access, etc. In embodiments, many types of events may map to the same checkpoint request type. Different types of checkpoint requests may include different basic contexts.

Additionally, the caller may define its own event context ("custom context") to be used towards the decisioning. Different subsets of rules and signals may be executed throughout the lifetime of an account.

Embodiments may simultaneously execute both synchronous and asynchronous decisioning. Embodiments may use a unified language (e.g., the DSL) for signals, rules, and decisions. Embodiments may be extensible and may use the language for decisioning in order to control the behavior of the engine through retry decisions and exception handling.

Embodiments may further implement static compiler optimizations, such as computing functions evaluating to constant at expression compile time, avoiding computing non-volatile functions with the same non-volatile arguments multiple times. Embodiments may avoid or reduce multiple calls to external components with arguments, which evaluate to the same value in runtime. Embodiments may assume that functions are not having side-effects so evaluation of arguments for operators with associativity can be done in parallel and in certain situations finish early before computing all the arguments. Embodiments may make reasonable division of total computational work into jobs computed in parallel by multiple local CPU cores, not blocking the computational branches computable with current information, but keeping the job scheduling overhead low.

Referring to FIG. 1, a system for rules-based decisioning of payment events is disclosed. System 100 may include services, such as payment services 105, signal services 110, and model services 115. Payment services 105 may be a service that provides payment services for one or more payment receiver (e.g., a merchant). Signal services 110 may be a service that stores data provided by third party vendors or transforms data, such as payment data. Model services 115 may take payloads defined as a map of both signals and raw data and return a score indicating the riskiness as well as the most significant features.

Decision engine service 130 may include a plurality of service modules, including context orchestration module 132, signals orchestration module 134, definitions cache 136, rules execution module 138, decision reduction module 140, and definitions cache 142. In one embodiment, one or more of content orchestration module 132, signals orchestration module 134, definitions cache 136, rules execution module 138, decision reduction module 140, and definitions cache 142 may be provided as a single service.

Input 120 to decision engine 130 may be a payment request from a caller, such as a payment receiver (e.g., a merchant). The payment request may be received as a synchronous request (e.g., in real time) or an REST input, Kafka input, gRPC input, etc. In one embodiment, a REST input may be a synchronous request, a Kafka input may be an asynchronous request, and a gRPC input may be either a synchronous request or an asynchronous request.

Context orchestration module 132 may query services 106 to prepare the context of a request, and may query application database(s) 135 to see if there are signals from a previous execution of the decision engine for this request (due to retries) or from a different checkpoint that may use the same request context (or parts of).

Signals orchestration module 134 may receive input from signal services 110 and model services 115. Signal orchestration module 134 may transform the raw signals using standard and user defined functions. For example, it may combine the results of the raw signals and transformed signals, and may provide the combination to machine learning models to get "secondary" signals.

Rules execution module 136 may execute multiple rules in parallel. For example, rule is an expression that is evaluated into a Boolean result and associated with three decision expressions: triggered, timeout, and error. If the rule evaluates to true, then the output is a list of decisions that are the result of applying the triggered decision expression to the context. If the rule expression evaluation results in an error, then the output is a list of decisions that are the result of applying the error decision expression to the context. If the rule does not finish evaluating within the time constraints, then the output is a list of decisions that are the result of applying the timeout decision expression to the context. If the rule evaluates to false, then no decisions are returned.

Decision reduction module 138 may take a list of rules executions and make a final list of decisions based on one or more decision reduction rule. In one embodiment, decision reduction module 138 may use a configurable algorithm to combine multiple decisions. Depending on the type of decision and the choice of algorithm, the final list of decisions may be a subset of the original decisions, or it may be a new decision. For example, in the most basic algorithm, echo decisions are purely additive so the list of original decisions is copied completely. Review decisions, however, have a hierarchy and the most restrictive is used (e.g., Deny>Manual Review>Pass). Reserve decisions are combined to provide the most restrictive reserve results. Retry decisions choose the shortest delay for the next execution time. Alternative algorithms may choose different combinations leveraging the prioritization of different rules (so decisions from higher priority rules override decisions from lower priority rules).

Application database(s) 135 may store the execution details. In one embodiment, application database(s) 135 may store the context, the signal values, the rule results, the raw decisions, and the final decisions. In one embodiment, a cloud-based database (e.g., Google BigTable) may be used. One or more application database 135 may be provided as is necessary and/or desired.

Definitions cache 140 may store parsed functions for each signal and rule that may be evaluated on the context associated with a particular checkpoint. SQL Database 155 may store the signal and rule definitions for each checkpoint. Signals and rules may be stored as raw strings of the domain specific language, along with metadata, such as the author and modification time. The definition cache stores parsed functions for each signal and rule that can be evaluated on the context associated with the particular checkpoint.

Message queue 170 may publish the decision results so that multiple services can act on the list of final decisions as well as replicating the result into the application database and a data warehouse for analytic purposes. The message queue may be Kafka-based.

Figure 2:
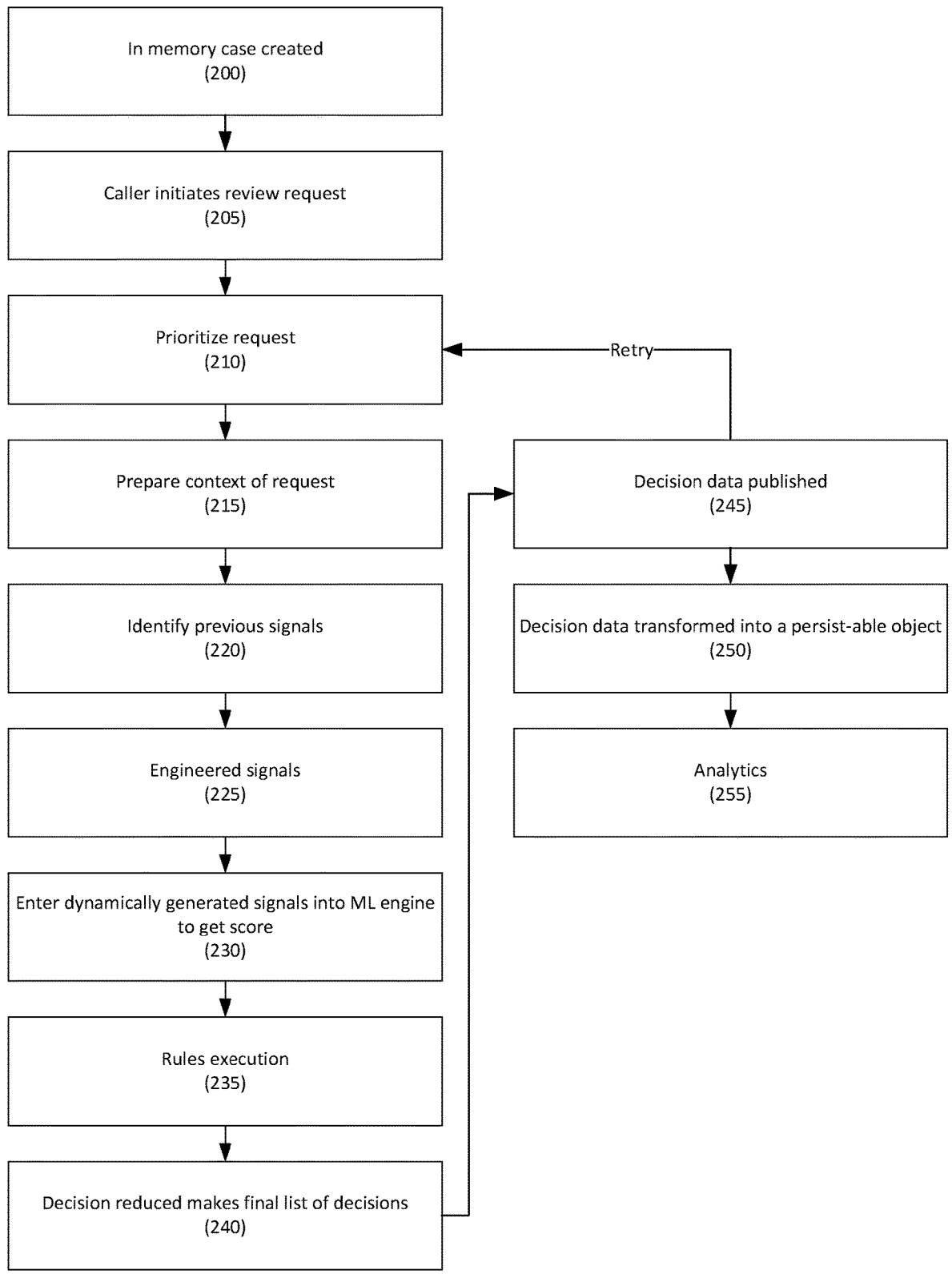
FIG. 2 depicts a method for rules-based decisioning of events according to one embodiment.

Referring to FIG. 2, a method for rules-based decisioning of payment events is provided according to one embodiment.

In step 200, an in-memory cache may be created. For example, embodiments may retrieve checkpoints, signals and rules definition from, for example, a Cloud SQL database, parses the expressions and maintains an in-memory cache. The cache is used for evaluating any incoming review requests. The step is repeated at a fixed interval, so that when any new definitions are added from the Definition Editor UI, the cache will be updated quickly.

In step 205, a caller, such as a system, an application, a program, etc., for a payment receiver, such as a merchant, may initiate a checkpoint review request. In one embodiment, the request may be a synchronous request, or an asynchronous request. For example, the request may be received from a REST service (synchronous), a Kafka service (asynchronous), a gRPC service (synchronous/asynchronous), etc.

In one embodiment, the checkpoint review request may be for a payment event or a non-payment event, such as merchant onboarding events, API access events, etc.

In step 210, the request may be prioritized. In one embodiment, a risk queue manager service, such as Koblenz, may prioritize the request and interface with Teton via gRPC.

In step 215, a basic context of the request may be prepared. In one embodiment, the context may include a limited set of objects (e.g., beyond the minimum set to specify the request) that may be used as starting ids to request data from other services and generate signals. For example, the set of objects at the payment checkpoint may include in-memory representation of the payer and merchant.

In embodiments, the context may simplify the creation of signals.

In step 220, the system may check to see if the application database contains signals from a previous execution on this request (e.g., due to retry). In embodiments, prior executions may be identified by the checkpoint request. The system may also load signals that were generated at a different checkpoint request if there are related parts of the context to avoid re-computing expensive signals.

For example, signals for a merchant account may be generated during periodic anti-money laundering checkpoints, and then used at the merchant's payout event checkpoint in order to reduce latency.

In one embodiment, the system may be used for testing purposes when writing new rules or signals. For example, the system may use previously-computed signals or context in order to provide an accurate impression of the result of the new signal or rule.

In step 225, signals may be generated using data source functions based on the basic context. Signals may include raw data, raw signals, transformations of raw data using user-defined functions, engineered signals, etc. An example of a raw signal is a geolocation, and an example of an engineered signal is the distance between two geolocations.

In step 230, both raw and engineered signals may be provided to ML models as features to get model scores as "secondary" signals.

In step 235, rules may be executed in parallel with each other to identify potential decisions. The rules may depend on the basic context, raw data, raw signals, engineered signals, or secondary signals. In one embodiment, a decision may be made based on waiting only for the highest priority rules to complete (with best effort for the others), or strictly time-based (best effort for all rules).

In step 240, a list of final decisions from the potential decisions may be generated based on one or more predefined decision reduction rule. In embodiments, there may be only one final decision per decision type. With echo decisioning, however, multiple final decisions may be provided per decision type. Depending on the type of decision, it may be reasonable to return two decisions of the same type (echo decision), while for other types it would be incoherent (review decision).

In one embodiment, a decision reducer may generate the final list of decisions. For example, the decision reducer may use a configurable algorithm to generate the final list of decisions. Using a simple conservative algorithm, echo decisions are purely additive so the list of original decisions is copied completely, while review decisions have a hierarchy and the most restrictive may be selected (e.g., Deny>Manual Review>Pass). Reserve decisions may be combined to provide the most restrictive reserve results (e.g., withholding the largest amount). Retry decisions may choose the shortest delay for the next execution time.

Alternative algorithms may choose different combinations, leveraging the prioritization of different rules (e.g., so decisions from higher priority rules override decisions from lower priority rules). Depending on the business needs, including the use of machine learning models, more sophisticated algorithms may be used to select the appropriate decision from the list.

In step 245, at the conclusion of decision execution, the decision data may be published. For example, all data may be published in a single message, such as a "DecisionsEvent," to Kafka.

In one embodiment, the decision may be returned to the caller if the call is a synchronous call.

If any step of the execution was not successful, a message containing the decision data computed up to this step may be published. In one embodiment, the engine or the dynamic rules will specify a consecutive retry mode, and the request may be retried by, for example, prioritizing the request again in step 210.

In step 250, the published decision data may be transformed into a persistable object, and may be saved to a database, such as Google BigTable.

In step 255, the published execution data may be loaded into a data warehouse (e.g., Google BigQuery) for analytical purposes. For example, the published data may be used for model training, identifying new fraud patterns, or generating reports. Reports might include the frequency or distribution of individual signals or rules as well as the number of requests that result in a particular decision.

It should be recognized that although several different embodiments are disclosed, these embodiments are not exclusive. Thus, although certain features may be disclosed in the context of one embodiment, the features may be used any embodiment as is necessary and/or desired.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for rules-based decisioning of events, comprising:

creating, by a computer program executed by a financial institution backend, an in-memory cache by parsing stored checkpoints, signals, and rules definitions, wherein the parsed stored checkpoints, the parsed signals, and the parsed rules definitions comprise in-memory cached definitions, wherein the in-memory cache definitions are periodically updated;

receiving, by the computer program, an event;

creating, by the computer program, a checkpoint in response to the event, wherein the checkpoint includes an event context, wherein the event context includes a plurality of objects, and wherein the plurality of objects includes an identification of a first party associated with the event and an identification of a second party associated with the event;

prioritizing, by the computer program, the checkpoint;

generating, by the computer program using the in-memory cached definitions, a raw signal for the event context and an engineered signal that is based on the raw signal;

generating, by the computer program and using a machine learning model, a secondary signal based on the raw signal and the engineered signal;

updating, by the computer program, the plurality of objects to include the raw signal, the engineered signal, and the secondary signal;

executing, by the computer program and using the in-memory cached definitions, a rule on at least one of the plurality of objects to generate a list of potential decisions, wherein the rule includes an expression that is evaluated into a Boolean result, wherein the Boolean result is associated with a decision expression, and wherein the potential decisions are a result of applying the decision expression during the executing the rule;

reducing, by the computer program, the list of potential decisions to a list of final decisions using a conservative algorithm;

publishing, by the computer program, the final decisions and supporting data rules and signals execution details to a messaging system; and executing, by the computer program, the final decisions.

2. The method of claim 1, wherein the checkpoint is created as a result of a synchronous request.

3. The method of claim 1, wherein the checkpoint is prioritized using a risk queue manager service.

4. The method of claim 1, wherein the decision expression comprises one of a triggered decision expression, a timeout decision expression, and an error decision expression.

5. The method of claim 1, further comprising:
checking, by the computer program, for signals indicating a previous execution of the checkpoint; and
loading, by the computer program, signals generated in the previous execution of the checkpoint.

6. The method of claim 1, wherein the engineered signals are generated based on at least one user-defined function.

7. The method of claim 1, further comprising:
generating, by the computer program, at least one machine learning model score.

8. The method of claim 1, wherein the list of potential decisions is generated based on the completion of high-priority rules.

9. The method of claim 1, wherein the list of potential decisions is generated based on the completion of time-based rules.

10. The method of claim 1, wherein the final decisions comprise an echo decision.

11. The method of claim 1, wherein the final list of decisions is reduced based on a hierarchy.

12. The method of claim 11, wherein the hierarchy is based on restrictiveness.

13. The method of claim 11, wherein the hierarchy is based on a shortest delay in execution time.

14. The method of claim 11, wherein the hierarchy is based on machine learning.

15. A system for rules-based decisioning of events, comprising:
a financial institution backend comprising:
at least one computer processor; and
a non-transient computer readable medium;
wherein the non-transient computer readable medium comprises program instructions that cause the at least one computer processor to perform the following:
create an in-memory cache by parsing stored checkpoints, signals, and rules definitions, wherein the parsed stored checkpoints, the parsed signals, and the parsed rules definitions comprise in-memory cached definitions,
wherein the in-memory cache definitions are periodically updated;
receive an event;
create a checkpoint in response to the event, wherein the checkpoint includes an event context, wherein the event context includes a plurality of objects, and wherein the plurality of objects includes an identification of a first party associated with the event and an identification of a second party associated with the event;
prioritize the checkpoint;
generate a raw signal for the event context using the in-memory cached definitions and an engineered signal that is based on the raw signal;
generate, using a machine learning model, a secondary signal based on the raw signal and the engineered signal;
update the plurality of objects to include the raw signal, the engineered signal, and the secondary signal;
use the in-memory cached definitions, execute a rule on at least one of the plurality of objects to generate a list of potential decisions, wherein the rule includes an expression that is evaluated into a Boolean result, wherein the Boolean result is associated with a decision expression, and wherein the potential decisions are a result of applying the decision expression during the executing the rule;
reduce the list of potential decisions to a list of final decisions;
publish the final decisions and supporting data rules and signals execution details to a messaging system; and
execute the final decisions.

16. The system of claim 15, wherein the decision expression comprises one of a triggered decision expression, a timeout decision expression, and an error decision expression.

17. The system of claim 15, wherein the non-transient computer readable medium further comprises program instructions that cause the at least one computer processor to perform the following:
check for signals indicating a previous execution of the checkpoint; and
load signals generated in the previous execution of the checkpoint.

18. The system of claim 15, wherein the non-transient computer readable medium further comprises program instructions that cause the at least one computer processor to generate at least one machine learning model score.

19. The system of claim 15, wherein the final list of decisions is reduced based on a hierarchy, and the hierarchy is based on restrictiveness or a shortest delay in execution time.

20. The system of claim 15, wherein the final list of decisions is reduced based on a hierarchy, and the hierarchy is based on machine learning.

* * * * *